Dec. 1, 1953 | G. E. BERENS ET AL | 2,661,397

MAGNETIC RECORDING

Filed May 8, 1948

3 Sheets-Sheet 1

INVENTOR.
Gregory E. Berens & Charles Colbert
BY Dybvig & Dybvig
Their Attorneys Dec. 1, 1953 G. E. BERENS ET AL 2,661,397

MAGNETIC RECORDING

Filed May 8, 1948 3 Sheets-Sheet 2

INVENTOR.

Gregory E. Berens & Charles Colbert

BY Dybvig & Dybvig

Their Attorneys

Dec. 1, 1953 G. E. BERENS ET AL 2,661,397

MAGNETIC RECORDING

Filed May 8, 1948 3 Sheets-Sheet 3

INVENTOR.

Gregory E. Berens & Charles Colbert

BY Dybvig & Dybvig

Their Attorneys

Patented Dec. 1, 1953

2,661,397

UNITED STATES PATENT OFFICE 2,661,397

MAGNETIC RECORDING

Gregory E. Berens and Charles Colbert, Dayton, Ohio

Application May 8, 1948, Serial No. 25,914

2 Claims. (Cl. 179—100.2)

The invention described herein may be manufactured and used by or for the United States Government for governmental purposes without payment to us of any royalty thereon.

This invention relates to recording devices for storing and reproducing intelligence and the method of using the same, and more particularly to recording devices utilizing a strip of material for the recording medium, although not necessarily so limited.

There are certain limitations to the use of recordings. For example, the top frequency that can be reproduced is, among other things, a function of the relative speed between the record and the reproducing head. If the relative speed is on the order of two and one-half inches per second, then the upper limit of satisfactory reproduction of the sound is on the order of a frequency of twenty-five hundred cycles per second. This might be compared to the reproduction of music over an ordinary telephone system. It would be better for the adequate reproduction of music, if the upper limit were five thousand cycle per second or higher.

The fidelity of reproduction may be greatly improved by increasing the relative speed of the recording head with respect to the record and correspondingly the reproducing head with respect to the record. If, for example, the relative speed is doubled, that is, five incher per second, frequencies up to five thousand per second may be satisfactorily reproduced. This results in fairly satisfactory reproduction of music.

In commercial theaters and movies the rate of speed of the film that passes through the projector results in satisfactory recording and reproduction by the use of stationary heads mounted in the vicinity of the film as it is fed through the projector.

Making recordings on a magnetic film in the margin of an 8 mm. film has not been satisfactory for the reason that the speed of the film is too slow. An 8 mm. film travels through the projector at the normal rate of about two and one-half inches per second. This speed may be increased or decreased within limits. As stated above, two and one-half inches per second is too slow for satisfactory reproduction of music.

An object of this invention is to provide a recording and reproducing system utilizing a magnetic coating in a sheet of material, wherein the recording head and the reproducing head are mounted for movement in a direction opposite to the direction of movement of the magnetic coating, to thereby produce a relative movement between the recording head or reproducing head and the film so as to result in satisfactory reproduction.

Another object of this invention is to provide a system of magnetic recording wherein two or more parallel, magnetically interrupted segments of continuous magnetic track are used for recording intelligence, wherein the segments are recorded successively in such a manner as to utilize all tracks of the system to thereby produce a continuous record.

Another object of this invention is to provide two or more magnetic strips upon the same sheet of record material wherein the recordings upon the strips are staggered so as to be reproduced successively to produce a continuous record.

Another object of this invention is to provide a pair of magnetic strips or bands on a film that are adapted to have recorded thereon and reproduced therefrom equal length staggered segments.

Another object of this invention is to provide a pair of magnetic tracks upon a moving picture film, wherein the film moves through the projector at a rate of speed too slow for the desired fidelity of reproduction when advanced past a stationary recording or reproducing head, wherein the record is produced in staggered segments of equal length, and the record reproduced by means of a rotary head having flux gaps angularly displaced 180° and axially displaced by a distance equal to that between the tracks and traveling at a speed equal and opposite to the movement of the film.

Another object of this invention is to provide a magnetic record wherein interrupted strips of track are used to produce a continuous record.

Another object of this invention is to provide a method for storing and reproducing intelligence in which the maximum amount of intelligence can be stored in a minimum of space.

Another object of this invention is to provide a method for storing and reproducing intelligence in which maximum possible fidelity is achieved.

A further object of this invention is to produce a method for storing and reproducing intelligence in which maximum playing time is achieved.

A further object of this invention is to provide a method for storing and reproducing intelligence in which both increased playing time and increased fidelity are achieved.

Another object of this invention is to provide a method for storing and reproducing intelligence in which maximum area of storage medium is utilized with unidirectional progression of the storage medium.

A further object of this invention is to provide a method for storing and reproducing intelligence in which editing is facilitated, thus allowing easy addition, deletion and transposition of recorded intelligence, regardless of where it appears on the storage medium.

Another object of this invention is to provide a method for storing and reproducing intelligence in which greater fidelity can be achieved, as in sound motion pictures, when the speed of progression of the storage medium cannot be increased.

A further object of this invention is to provide a method for storing and reproducing intelligence in which greater fidelity can be achieved, as in sound motion pictures, wherein the direction of progression of the storage medium cannot be reversed.

Another object of this invention is to provide a method for storing and reproducing intelligence in which wastage of no portion of the storage medium results from lack of foreknowledge of the total playing time required.

A further object of this invention is to provide a method for storing and reproducing intelligence in which increased fidelity can be achieved on sound motion picture film by use of multiple storage paths scanned alternately by recording and reproducing heads made to move in a direction opposed to that of the storage medium.

Other objects and advantages reside in the construction of parts, the combination thereof and the mode of operation, as will become more apparent from the following description.

Figure 2:
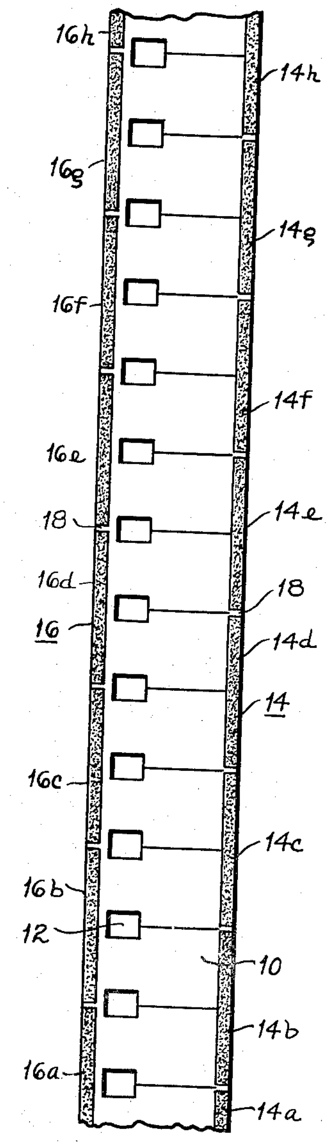
Figure 2 is a fragmentary view of a film provided with magnetic coatings which are in actuality continuous parallel, magnetic tracks. The segmentation shown refers to the sequence in which the signal intelligence is magnetically impressed, as explained below.

In the storage of intelligence for later reproduction, it is important that the greatest amount of intelligence be stored in the smallest amount of space, that the reproduction be of acceptable quality and that editing be facilitated.

In any device for the storage and/or reproduction of intelligence, it is important that the available area of storage medium be utilized to provide the maximum lineal storage path. The playing time, or amount of intelligence storeable, is inversely proportional to the speed at which the lineal storage path is utilized. The speed at which the lineal storage path is utilized is governed by the relative speed between the path and the recording or reproducing head.

The quality of recording or reproduction is, on the other hand, proportional to the relative speed between the path and the recording or reproducing head. It can, therefore, be stated that:

since $$V_r \alpha \frac{1}{P.T.}$$

and $$V_r \alpha Q$$

therefore $$V_r \alpha \frac{Q}{P.T.}$$

where $V_r$ is the relative speed between the lineal storage path or track and the recording or reproducing head, P. T. is the playing time of the total available lineal storage path and Q is the quality, or fidelity of recording or reproduction.

In recording and reproducing intelligence, it is desirable that the storage medium progress unidirectionally in order to facilitate editing. In some instances, such as in sound motion pictures, it is mandatory that the storage medium progress unidirectionally.

In some devices for the storage and reproduction of intelligence, such as, for example, present single path magnetic tape recorders, part of the available area of storage medium is not utilized, thereby wasting potential lineal storage path, although unidirectional progression of the storage medium is achieved. In other such devices, as, for example, multi-path "to-and-fro" magnetic tape recorders, available area of storage medium is more fully utilized, but the advantages of unidirectional progression of the storage medium are sacrificed. In present sound motion picture films, as well as in single path, unidirectional magnetic tape recorders, the speed at which the lineal storage path is utilized is identical with the speed at which the storage medium progresses.

It is well known that general practice with single storage path, unidirectional magnetic tape recorders is to cause the storage medium to progress past a recording and/or reproducing head which is fixed in position and non-rotating, so that a single, relatively narrow, lineal storage path is scanned by the head. Generally, the total available area of storage medium is not utilized.

It will be seen that if a multiplicity of parallel lineal storage paths were utilized on the entire available width of the storage medium, and if one or more rotary recording and reproducing heads, having suitable brush and slip-ring signal pick-offs, were arranged so that the magnetic gaps therein move in a direction opposite to the direction of motion of the storage medium, and the magnetic gaps scan sequentially in regular segments, two or more of the available parallel lineal storage paths, better utilization of the available area of storage medium is achieved. It will also be seen that either longer playing time or greater fidelity, or a combination of both, may be achieved. It will also be seen that unidirectional progression of the storage medium is retained during recording and reproduction.

The same results will be achieved if one or more reciprocating recording and reproducing heads are arranged so that the magnetic gaps therein move in a direction opposite to the direction of motion of the storage medium, so that these gaps scan sequentially in regular segments two or more of the available parallel lineal storage paths.

Figure 6:
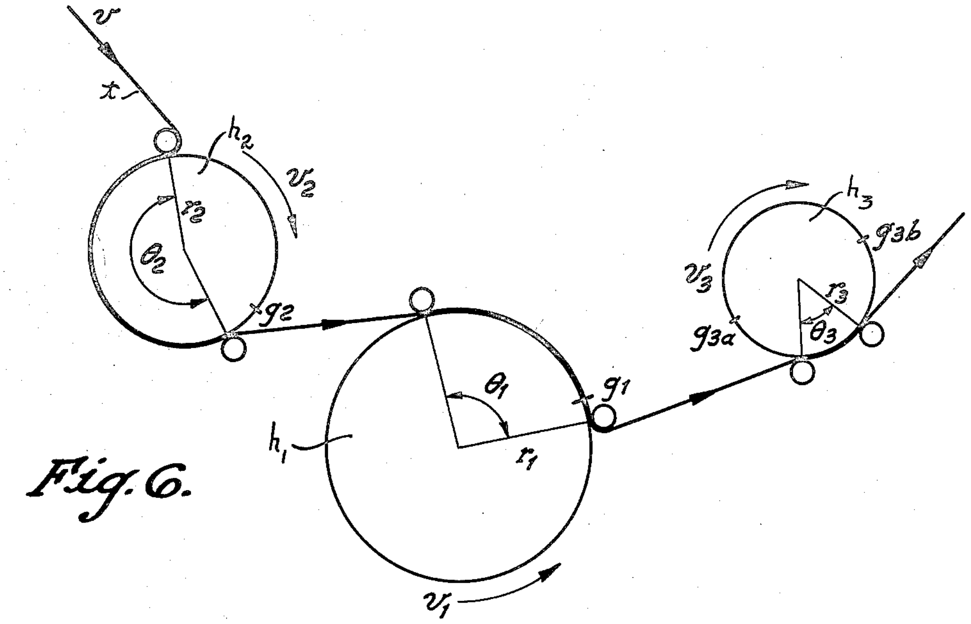
Figure 6 is a schematic showing of a series of recording or pick-up heads shown for the purpose of illustrating the mathematical equations set forth herein.
Figures 7, 8:
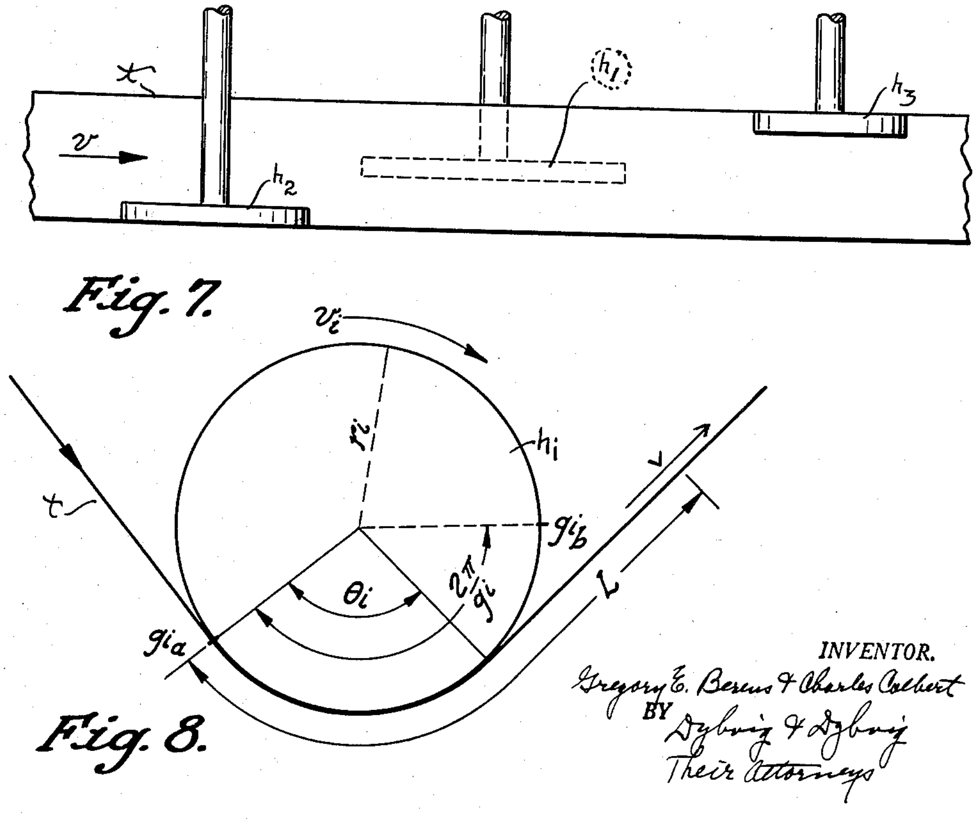
Figure 7 is a top plan view of the schematic showing in Figure 6, so as to show the offset relation of the several heads.
Figure 8 is another schematic showing used in connection with the development of the theory involved.

In the accompanying drawings, Figure 6 shows a system for recording and reproducing intelligence by means of rotating heads designated herein by the letter $h$ and indicated sequentially by number as $h_1$, $h_2$ and $h_3$ of radii $r_1$, $r_2$ and $r_3$, each having one or more recording and reproducing contact points or recording elements $g_1$, $g_2$, $g_{3a}$, $g_{3b}$, such as magnetic gaps, writing styli, et cetera, with the letter $g$ herein indicating the word gap and with numbers or letters following the letter $g$ indicating reference to particular or different gaps. The storage medium or tape indicated in Figs. 6, 7 and 8 by the letter $t$ for tape is provided with magnetic tracks corresponding to the tracks 14 and 16 on the storage medium 10 in Figs. 1 and 2. Each flux gap $g_1$, $g_2$, $g_{3a}$ and $g_{3b}$ in Fig. 6 records in any desired coordinated sequence. As indicated in Figs. 6 and 7 gap $g_1$ is assigned to one track, gap $g_2$ is assigned to a different track, and gaps $g_{3a}$ and $g_{3b}$ are assigned to a still different track. Storage medium tape $t$ is passed over each head in a direction shown opposite to the direction of rotation of such heads and making angles of contact or of wrap therewith of magnitudes designated as $\theta_1$, $\theta_2$ and $\theta_3$, where the symbol $\theta$ indicates an angle of wrap and $\theta$ followed by a number or a letter indicates reference to a particular angle of wrap on a particular head. Heads $h_1$, $h_2$ and $h_3$ rotate with peripheral speeds indicated by the letter $v$ as $v_1$, $v_2$ and $v_3$, respectively.

In Figure 7 head $h_2$ is shown at one extreme of the storage medium, and $h_1$ is shown at a position between the extremes and $h_3$ is shown at the opposite extreme. The positions of heads $h_1$, $h_2$ and $h_3$ coincide with the positions of selected storage paths or tracks on the storage medium. In Figures 6 and 7 three heads $h_1$, $h_2$ and $h_3$ are shown, although a greater or lesser number of such heads and corresponding lineal storage paths or tracks may be utilized. There shall be one track assigned to each head. In the general system the number of heads is designated as the number $n$.

In Figure 8 a head $h_i$ is shown of radius $r_i$, rotating at peripheral speed $v_i$ the number of gaps on head $h_i$ being $g_i$, of which only two adjacent gaps $g_{ia}$ and $g_{ib}$ are shown separated by an angle of separation $$\frac{2\pi}{g_i}$$

Storage medium $t$ passes over an arc on head $h_i$ making an angle of contact $\theta_i$ at speed $v$ in a direction opposite to that of motion of the head $h_i$. Length L is the segment of lineal storage path scanned by a single gap in the time such contact point sweeps out the angle $\theta_i$ along the arc thereof.

It is clear, therefore, that Figure 8 represents the $i$th head of a general system of $n$ heads similar to the system shown in Figures 6 and 7, where the general number $n$ is three.

It can be shown that, for maximum utilization of each and every lineal storage path or track in a system of $n$ heads, the relationships between the variables considered herein as applied to the assemblages shown in the accompanying drawings and particularly in Fig. 8 may be expressed as follows:

$$\frac{V}{V_i}=\frac{\theta_i g_i}{2\pi-\theta_i g_i} \qquad (1)$$

where V is the speed of the film or tape $t$, and $V_i$ is the peripheral speed of the $i$th head, $\theta_i$ is the angle swept by a gap on the $i$th head, and $g_i$ is the number of gaps on the $i$th head.

$$\sum_{i=1}^{i=n}\theta_i g_i=2\pi \qquad (2)$$

$$r_i=L\left(\frac{1}{\theta_i}-\frac{g_i}{2\pi}\right) \qquad (3)$$

where L is the length of film or tape scanned by a single gap $g$ in the time the gap $g$ sweeps out the angle $\theta_i$ of the head $h_i$.

an auxiliary equation is:

$$L(n-1)=\sum_{i=1}^{i=n}r_i\theta_i \qquad (4)$$

The relationships between the variables in the equivalent system employing a reciprocating head or heads could be similarly expressed.

The parameters in the above equations are related to the assemblages of the accompanying drawings as set forth in the following table.

*Table of equivalent elements*

| Description | Fig. No. | Element | Fig. No. | Element | Fig. No. | Element | Fig. No. | Element | Fig. No. | Element | Fig. No. | Element | Formulas |
|---|---|---|---|---|---|---|---|---|---|---|---|---|---|
| Tape, storage medium, film. | 1 | 10 | 6 | $t$ | 7 | $t$ | 8 | $t$ | 2 | 10 | 5 | 100 | |
| Tracks, lineal storage paths, bands. | 1 | 14, 16 | 2 | 14, 16 | 5 | 102, 106 | | | | | | | |
| No. of tracks | | | | | | | | | | | | | |
| Heads | 1 | 28 represents 2 heads. | 4 | 28 represents 2 heads. | 6 | $h_1, h_2, h_3$ | 7 | $h_1, h_2, h_3$ | 8 | $h_i$ | 5 | 108 | $n$. |
| No. of heads | | | | | | | | | | | | | |
| Gaps | 4 | 48 | 6 | $g_1, g_2, g_{3a}, g_{3b}$ | 8 | $g_{ia}, g_{ib}$ | | | | | | | $n$. |
| No. of gaps on the $i$th head. | | | | | | | 8 | $g_i$ | | | | | |
| Angle of contact, angle of wrap. | 1 | Shown as 180° | 6 | $\theta_1, \theta_2, \theta_3$ | 8 | $\theta_i$ | | | | | | | $g_i$. |
| Length of segment | | $14_a$, $14_b$, etc., $16_a$, $16_b$ etc. | 8 | L | | | | | | | | | $\theta_i$. |
| Radius of $i$th head | 6 | $r_1, r_2, r_3$ | 8 | $r_i$ | | | | | | | | | L. |
| Speed of the $i$th head | 6 | $v_1, v_2, v_3$ | 8 | $v_i$ | | | | | | | | | $r_i$. |
| Speed of the tape | 6 | $v$ | 7 | $v$ | 8 | $V$ | | | | | | | $V_i$. |
| | | | | | | | | | | | | | V. |

Referring to an illustrative embodiment of the invention as shown in the drawings, the reference character 10 indicates a film which may be a conventional 8 mm. film, provided with pin feed apertures 12 normally used in feeding the film through the camera and for feeding the film through the projector. This film is provided with two tracks 14 and 16 of magnetic material applied to the film in any suitable manner.

In view of the fact that the relative movement of film through projectors for home use is too slow for proper recording and reproducing by use of a stationary head and single track, two tracks or bands of magnetic material have been provided to be used in conjunction with a two-gap rotary head. The two bands are recorded in staggered segments in such a manner that the recordings are made upon segments of each band alternately and reproduced alternately, to provide thereby a continuous recording that progresses along both bands in alternate steps, so as to permit the utilization of a track length equal to twice the length of the film. A rotary head is used, the gaps of which move at a speed equal to and opposite to the movement of the film, thus doubling the relative speed between gaps and track. This device records and reproduces the segments on the bands alternately. The length of the segments is a function of the length of the effective stroke of the pick-up head or heads and of the relative speed between gaps and track.

Again, referring to the drawings, the successive segments on each side of the film have been referred to by lettered subscripts 14*a* to 14*h* and 16*a* to 16*h*. For convenience in description, the segments have been separated by blank spaces 18. In actual usage, the two bands will be continuous, the recordings on the segments being momentarily interrupted at the areas corresponding to the blank spaces.

In making the recording, the segment 14*a*, only a portion of which has been shown, is first recorded. Then the segment 16*a* is recorded. This is followed by a recording upon the segment 14*b*, the film moving downwardly, as viewed in Figure 2, and the recording mechanism, which will be described more fully later, moving upwardly. After the segment 14*b* has been recorded, the segment 16*b* is recorded, opposite segments being recorded alternately, the segments being arranged in staggered relation, as shown in Figure 2. For purposes of providing proper registry of the film with respect to the recording and reproducing mechanism, ends of each segment register in a predetermined manner with respect to the pin feed apertures 12 in the film or strip, as is also shown in Figure 2.

One or more heads having two or more gaps may be used in recording on the tracks. Furthermore, heads may be mounted for rotary or reciprocatory movement.

Figure 1:
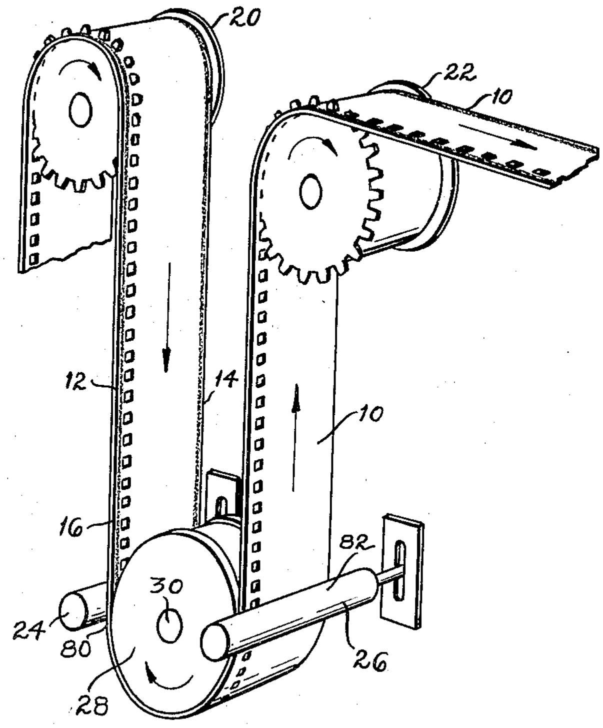
Figure 1 is a perspective view of an 8 mm. film recording or reproducing mechanism utilizing two parallel magnetic tracks.
Figure 3:
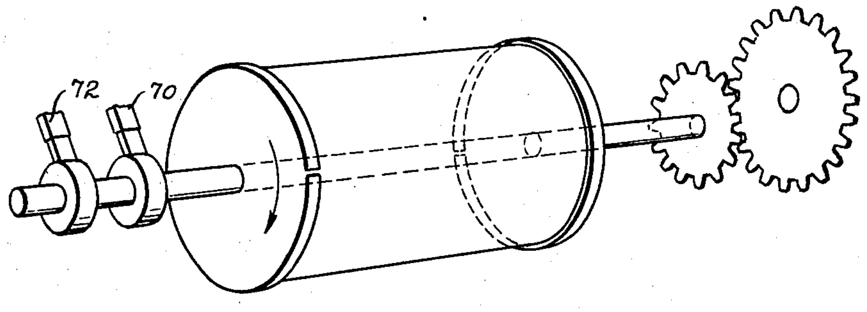
Figure 3 is a perspective view of a head at each of two gaps that may be used either for recording or reproducing a magnetic record similar to the one shown in Figures 1 and 2.
Figure 4:
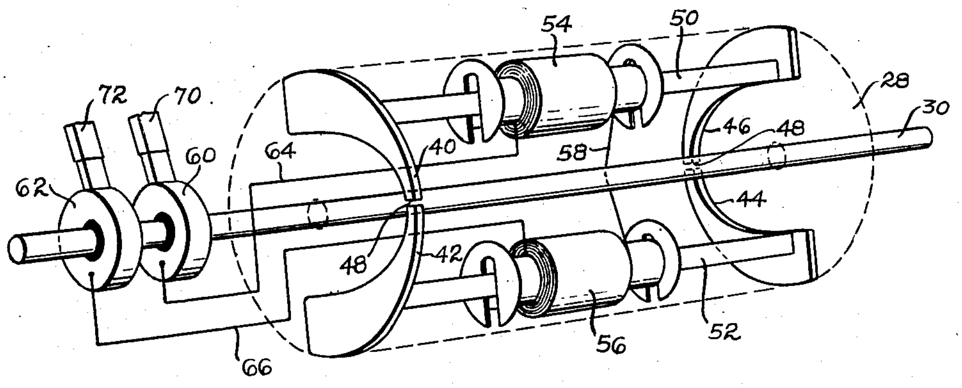
Figure 4 is an enlarged skeleton view showing the mechanism in the recording heads disclosed in Figure 3.

In Figure 1 the rotary method of recording and reproducing a film has been shown schematically. The mechanism includes a pair of constant speed sprocket wheels 20 and 22. The film is fed over the sprocket wheel 20, then downwardly between rollers 24 and 26 around recording or pick-up heads 28 and up over the sprocket wheel 22. The heads 28 also are shown in Figs. 3 and 4. The two sprocket wheels 20 and 22 are driven by a suitable mechanism not shown.

The recording or pick-up heads 28 are mounted upon a shaft 30 rotating in a direction opposite to the direction of movement of the film. The peripheral speed of the recording or reproducing heads 28 is the same as the speed of the film.

Furthermore, the circumference of a head is equal to a length of a segment, as will appear more fully later.

Fig. 3 shows two heads mounted on one gear-driven shaft, which is common to both heads. Fig. 4 is an internal detail view of Fig. 3. The head consists essentially of coils and associated magnetic laminations. The recording, pick-up, reproducing or magnetic head 28 contemplated hereby and illustratively shown in Fig. 4, is in actuality two heads each having one gap, each head, and consequently each gap, in this case, being assigned to one track. The laminations associated with one half of the magnetic path are indicated as 40, 50 and 46. The laminations associated with the remaining half of the magnetic path are indicated as 42, 52 and 44. The assemblage shown in Fig. 4 within a dash-line is inclosed within the cylinder shown in Fig. 3. The flux gaps 48 of Fig. 4 are indicated as correspondingly positioned open gaps in the cylinder in Fig. 3. Flux gaps 48 in Fig. 4 are elements similar to the flux gaps in Figs. 6 and 8. Each flux gap 48 is energized electrically from the brushes 70 and 72 and maintains a magnetic flux within the field of which a track of the film 10 or tape *t* passes as it wipes against the cylinder in Fig. 3. The film moves in a direction opposite to that of the cylinder. The relative speed between the flux gaps and the film is twice the film speed. As is well known to those skilled in the art of magnetic recordings and reproductions, each group of magnetic laminations is arranged in spaced relation so as to provide a flux gap 48. The magnetic members 50 and 52 support the coils 54 and 56. The coils 54 and 56 are connected in series by a lead 58 and connected to the slip rings 60 and 62 by means of leads 64 and 66.

A pair of brushes 70 and 72 are connected into a suitable circuit either for energizing the coils or for amplifying the signal picked up by the coils in response to the magnetic flux linking the air gap of the magnets.

As far as the explanation of the principle of operation is concerned, the structure described thus far may be used either for recording or for reproducing the signals. The pin feeding wheels 20 and 22 and the recording or reproducing mechanism 28, which may be referred to generically as a magnetic head, are driven from a common source such that the velocity of the film is preferably equal to but in opposite direction to the peripheral velocity of the magnetic head. The mechanism for driving these parts has not been shown for the reason that any suitable driving mechanism may be used.

For convenience of explanation, let it be assumed that one gap is located in the position designated by the reference character 80 in Figure 1. The other gap would then be located under the roller 26 in the position 82. Furthermore, let it be assumed that the film and the magnetic head 28 rotate and move in the directions of the arrows shown in Figure 1. From this it may be readily seen that the magnetic head in the position 80 is leaving or moving out of contact with the magnetic track 16 and at the same instant the other magnetic head in the position 82 is moving into contact with the magnetic track 14.

From the foregoing it can readily be seen that the distance between interruptions in the recording of the opposite tracks 14 and 16 is equal to one-half of the circumference of the head. Furthermore, it can readily be seen that the film in contact with the head extends over an arc subtending an angle of 180° of the head, as shown in Figure 1. In the event the area in contact with the head is less than 180°, there would be a short interval when the recording or the reproduction, as the case may be, would be interrupted. If the area in contact with the pick-up head is more than 180°, there may be a slight overlap. By causing the film to travel at a velocity slightly greater than the peripheral velocity of the pick-up head, the recording and reproduction may be continuous without overlapping the previous recorded segment. From the foregoing, it can readily be seen that the segments will be alternately recorded or reproduced, as the case may be, first the segment along the band or track 14, this followed by a like segment along the band 16, then back again to the succeeding segments of the band 14, et cetera. By this arrangement, the desired relative velocity may be doubled with respect to the movement of the film.

Instead of utilizing two tracks, one along either margin of the film, one track of approximately double width may be used. The tracks in the preferred embodiment have been shown on the broad side of the film and on the same side. Instead of being positioned on the broad side of the film, the magnetic coating material could be applied on the edges of the film.

Figure 5:
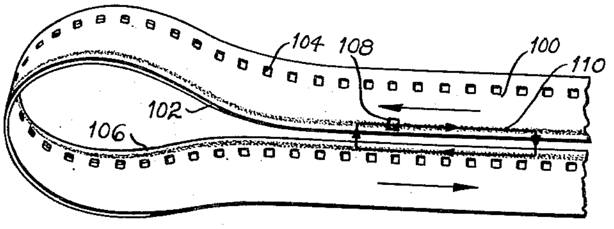
Figure 5 is a small fragmentary view illustrating a modified process.

Furthermore, the tracks may be located on opposite faces of the film, as for example, the film disclosed in Figure 5. In this modification, the film 100 is coated with a magnetic track or strip 102 applied to the margin opposite the margin containing the pin feed holes 104. On the opposite side of the film is a magnetic band 106 located between the pin feed holes and the outer margin of the film.

The feeding mechanism for feeding the film has not been shown in Figure 5; but the film may be fed in such a manner that the magnetic coating strips or bands 102 and 106 pass along parallel paths. A magnetic head 108, shown schematically, is actuated along the path 110 in the direction of the arrows so that the magnetic head 108 moves in the direction opposite to the direction of movement of the film. First the magnetic head moves in the direction opposite to the direction of the film, along the magnetic band 102, then when it comes to the extreme right position of the arrowed lines, the magnetic head is transferred so as to overlie and travel along the magnetic band 106 traveling towards the left, this portion of the film traveling towards the right, until the magnetic head comes to the extreme left end of the arrowed lines, when the magnetic head is again suddenly transferred so as to overlie the band 102. The mechanism for actuating the magnetic head and for actuating the film has not been shown, as any suitable actuating mechanism may be used.

Instead of utilizing one reciprocatory head, two reciprocatory heads may be used. Furthermore, instead of using two rotary heads, as shown in the preferred embodiment, a single rotary head may be used by merely causing a relative axial movement between the magnetic head and the film when transferring from one segment to another. In other words, various types of devices may be used for causing a relative speed between the magnetic head and the film that is greater than the speed of the film.

Instead of two paths, three or more could be used to accomplish the same result.

The device disclosed thus far has been described for use with a magnetic film for recording signal intelligence. The same principle might be used for producing and reproducing optical signals, as for example, signals used in sound recordings for motion pictures, wherein the intensity of the light is varied by thereby generate a fluctuating or a pulsating current.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A strip recording mechanism for recording intelligence along a plurality of parallel paths on a strip storage medium, comprising a plurality of cylindrical recording heads having equal radii and rotated by a common shaft, the number of heads being equal to the number of parallel paths, each head having on its periphery at least on recording element adapted to impose a record on the storage medium and to provide a magnetic flux gap with the magnetic flux gaps connected in a common magnetic circuit, means for moving the strip storage medium in one direction at a constant linear speed substantially in contact with each head over a predetermined arc, means for rotating each of said recording heads at a constant peripheral speed in a sense opposite the direction of storage strip movement, the variable factors of said mechanism being so selected that the sum of the products of the number of recording elements on each head times the predetermined arc of contact of the storage strip with the respective head expressed as an angle in radians shall equal 2 pi, and for each cylindrical recording head the ratio of the speed of the storage strip to the peripheral speed of the respective cylindrical head shall equal the product of the number of recording elements for the corresponding head and the arc of contact of the storage strip with the head expressed as an angle in radians divided by the quantity 2 pi minus said product, and for each cylindrical recording head the radius of the cylinder shall be equal to the length of record produced by any one recording element in one revolution of its corresponding recording head multiplied by a quantity equal to the fraction one over the arc of contact of the storage strip with the corresponding head expressed as an angle in radians minus the fraction, the numerator of which is the number of recording elements on the respective cylinder and the denominator of which is 2 pi, whereby a plural path record is produced, the segments of each path of which are formed in aligned abutting relation without physical gaps or overlaps therein and in which there is but one recording element effective to record at any given time.

2. A pair of magnetic heads, comprising a cylindrical surface between two axial ends, a first pair of laminations terminating in a first flux gap at an edge adjacent a first axial end of said cylindrical surface, a second pair of laminations terminating in a second flux gap adjacent the second axial end of said cylindrical surface and the first and second flux gaps being positioned at diametrical opposite edges of said cylindrical surface, a pair of magnetic members joining said first to said second pair of laminations, a coil on each of said pair of magnetic members, and means for energizing said coils.

GREGORY E. BERENS.
CHARLES COLBERT.

References Cited in the file of this patent

UNITED STATES PATENTS

| Number | Name | Date |
|---|---|---|
| 1,825,439 | Cawley | Sept. 29, 1931 |
| 1,825,441 | Cawley | Sept. 29, 1931 |
| 2,195,701 | Kent | Apr. 2, 1940 |
| 2,352,023 | Schuller | June 20, 1944 |

FOREIGN PATENTS

| Number | Country | Date |
|---|---|---|
| 331,576 | Great Britain | July 7, 1930 |